(12) United States Patent
Neal

(10) Patent No.: US 10,906,574 B1
(45) Date of Patent: Feb. 2, 2021

(54) PHONE CADDY STROLLER CLAMP APPARATUS

(71) Applicant: Brandy Neal, Sandy, UT (US)

(72) Inventor: Brandy Neal, Sandy, UT (US)

( * ) Notice: Subject to any disclaimer, the term of this patent is extended or adjusted under 35 U.S.C. 154(b) by 0 days.

(21) Appl. No.: 16/730,072

(22) Filed: Dec. 30, 2019

(51) Int. Cl.
*F16M 13/02* (2006.01)
*B62B 9/26* (2006.01)

(52) U.S. Cl.
CPC ..................... *B62B 9/26* (2013.01)

(58) Field of Classification Search
CPC ...... F16M 11/041; F16M 11/10; F16M 13/00; F16M 13/02; F16M 13/022; B62B 9/26; B62B 3/1428; B62B 3/1424; B62B 3/1416; H04M 1/04
See application file for complete search history.

(56) References Cited

U.S. PATENT DOCUMENTS

| | | | |
|---|---|---|---|
| 5,626,320 A * | 5/1997 | Burrell | B64D 43/00 248/227.4 |
| 8,020,829 B1 | 9/2011 | Tamayori | |
| 8,490,937 B2 * | 7/2013 | Crain | F16M 11/041 248/316.6 |
| 9,145,158 B2 | 9/2015 | Cruz | |
| D795,882 S | 8/2017 | Maldonado | |
| 9,840,264 B1 * | 12/2017 | Johnson | B62B 3/1416 |
| 9,969,450 B1 * | 5/2018 | Lu | B62J 11/00 |
| 10,081,382 B1 | 9/2018 | Alton | |
| 10,422,474 B2 * | 9/2019 | Bacallao | F16M 13/022 |
| 2010/0264182 A1 * | 10/2010 | Perlman | H04M 1/04 224/409 |

FOREIGN PATENT DOCUMENTS

WO    WO2016167720    10/2016

* cited by examiner

*Primary Examiner* — Corey N Skurdal

(57) ABSTRACT

A phone caddy stroller clamp apparatus for securing phones and tablets to strollers and shopping carts includes a holder body including a left panel and a right panel adjustably coupled around a medial portion. A lip is coupled to a panel front side of the left panel and the right panel to support a personal electronic device. A pair of upper clamp supports and a pair of lower clamp supports extend from a panel back side of the left panel and the right panel. Each of a pair of lower clamps includes a clamp pad and a screw engaged with a screw aperture to adjust a distance between the clamp pad and the upper bottom face to secure a stroller, a grocery cart, a car seat, or other bar and tube-shaped objects.

11 Claims, 5 Drawing Sheets

PHONE CADDY STROLLER CLAMP APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to phone holders and more particularly pertains to a new phone holder for securing phones and tablets to strollers and shopping carts.

(2) Description of Related Art Including Information Disclosed Under 37 CFR 1.97 and 1.98

The prior art relates to phone holders to attach personal electronic devices to various fixed objects. Few devices are specifically designed to attach to bars and tubes, and even fewer to strollers and to shopping carts. Such attachment devices are often not easily engaged and released and do not easily accommodate bends or changing thicknesses of the bar or tube.

BRIEF SUMMARY OF THE INVENTION

An embodiment of the disclosure meets the needs presented above by generally comprising a holder body including a left panel and a right panel slidably coupled around a medial portion. The left panel and the right panela are each rectangular prismatic and have a panel front side, a panel back side, a panel outer side, an open panel inner side, a panel top side, and a panel bottom side. The open panel inner side slidably receives the medial portion. A lip is coupled to the panel front side of each of the left panel and the right panel and is configured to support a personal electronic device. A pair of upper clamp supports is coupled to the holder body and extends from the panel back side of the left panel and the right panel. Each upper clamp support has a concave upper bottom face. A pair of lower clamps is coupled to the holder body and includes a pair of lower clamp supports extending from the panel back side of the left panel and the right panel below the upper clamp supports. Each lower clamp support has a threaded screw aperture extending from a concave lower top face through a lower bottom face. Each lower clamp includes a clamp pad and a screw coupled to the clamp pad. The screw is threadably engaged with the respective screw aperture to adjust a distance between the clamp pad and the upper bottom face to secure a stroller, a grocery cart, a car seat, or other bar and tube-shaped objects.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
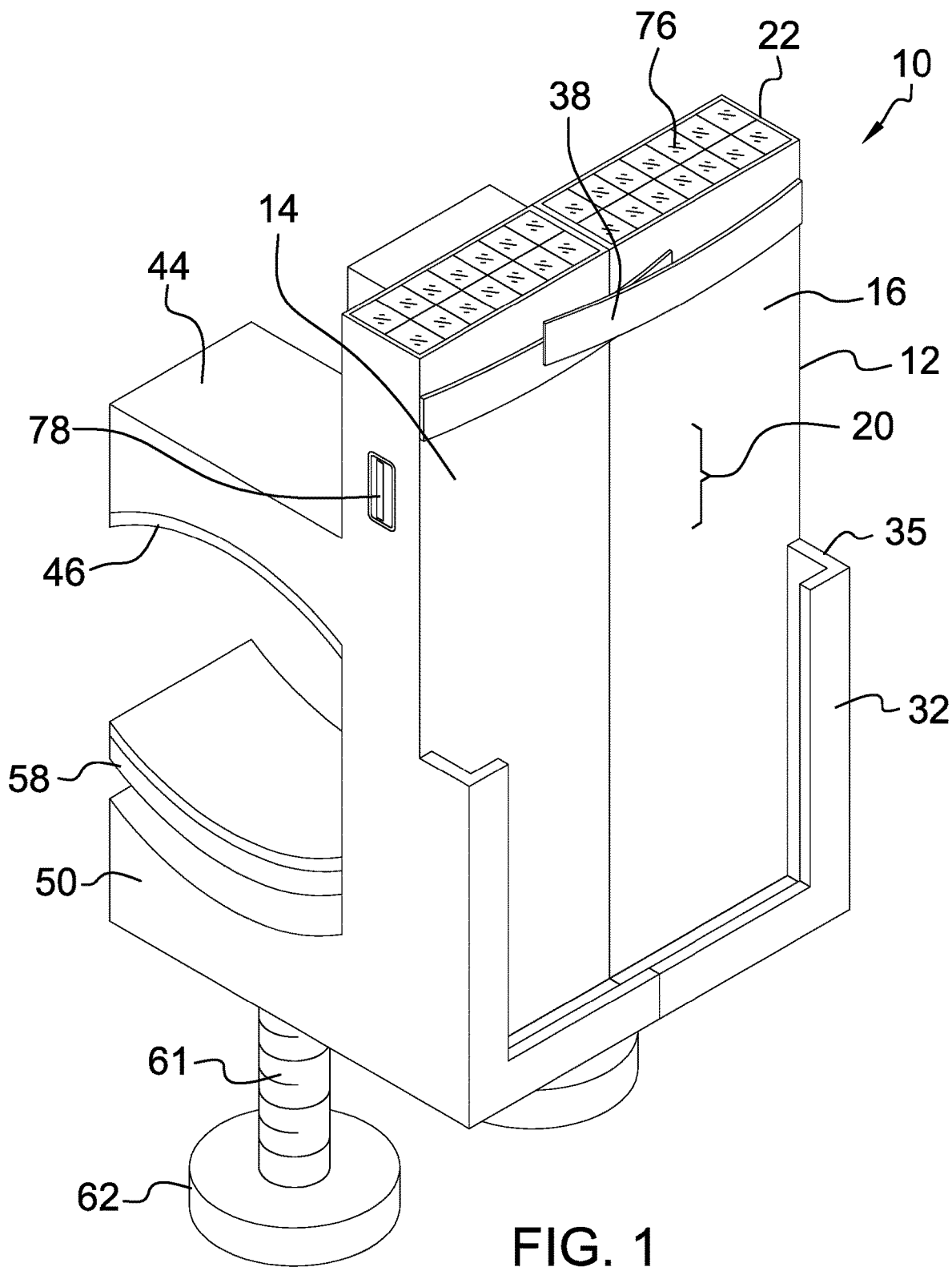
FIG. 1 is an isometric view of a phone caddy stroller clamp apparatus according to an embodiment of the disclosure.
Figure 2:
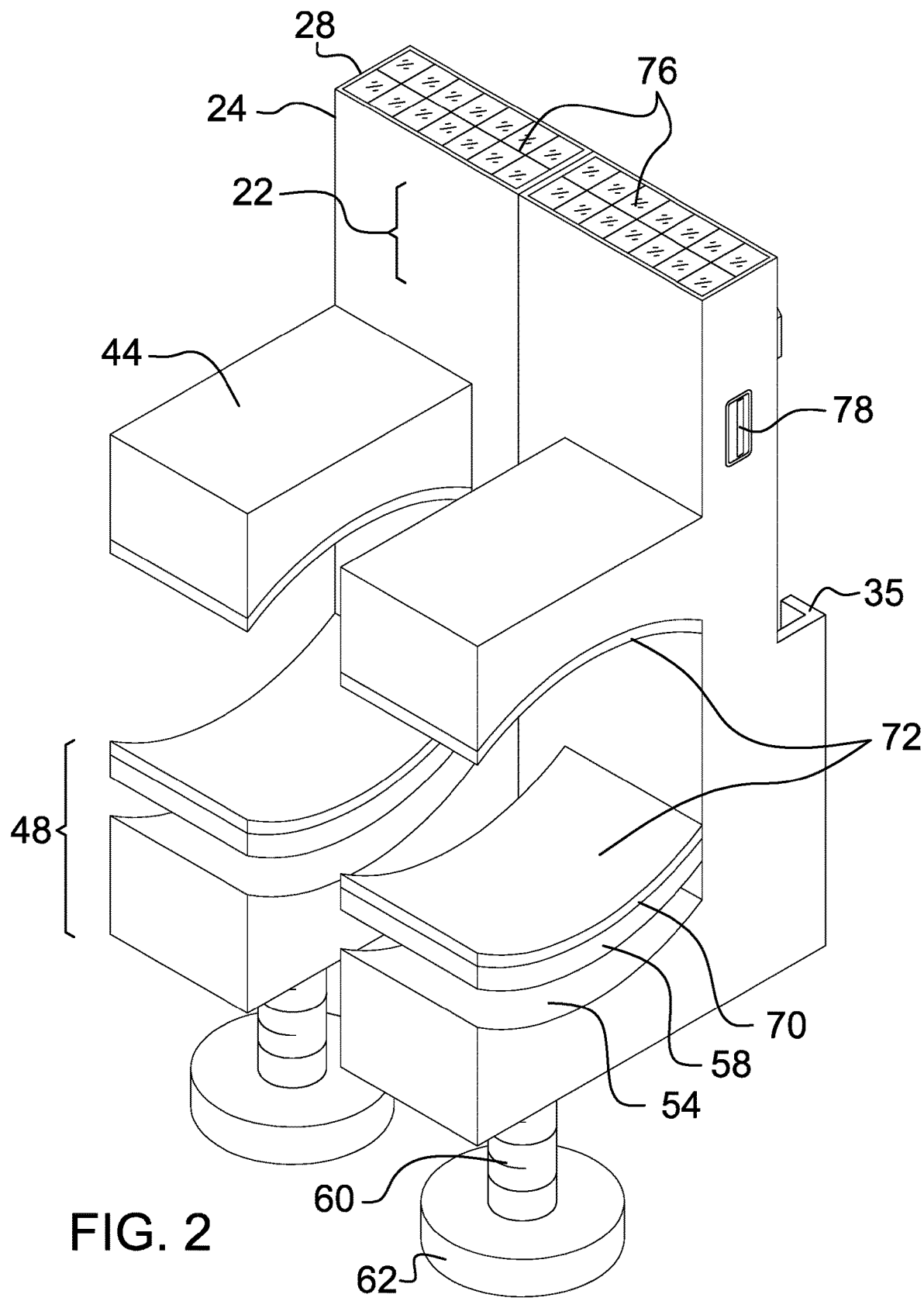
FIG. 2 is an isometric view of an embodiment of the disclosure.
Figure 3:
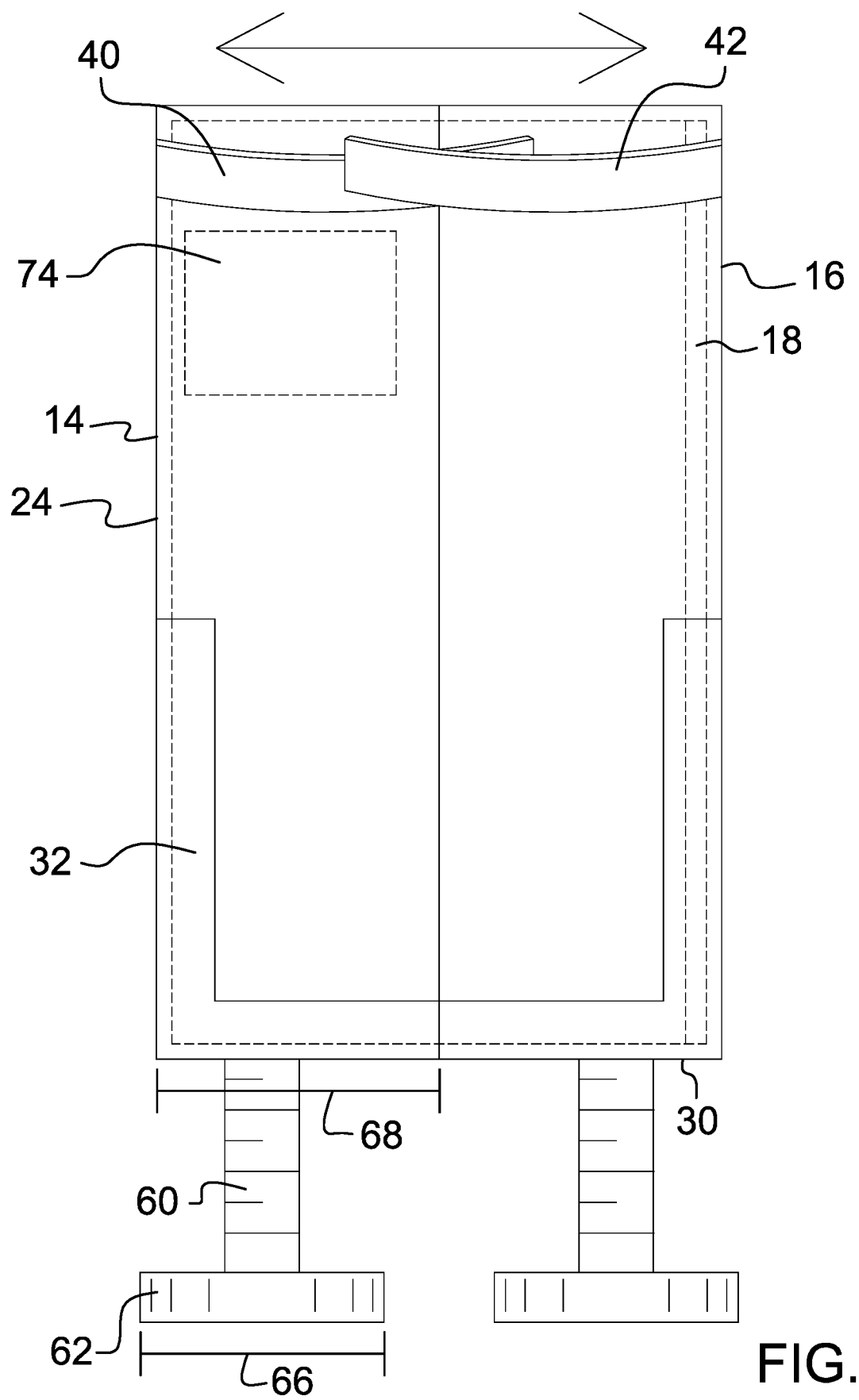
FIG. 3 is a front elevation view of an embodiment of the disclosure.
Figure 4:
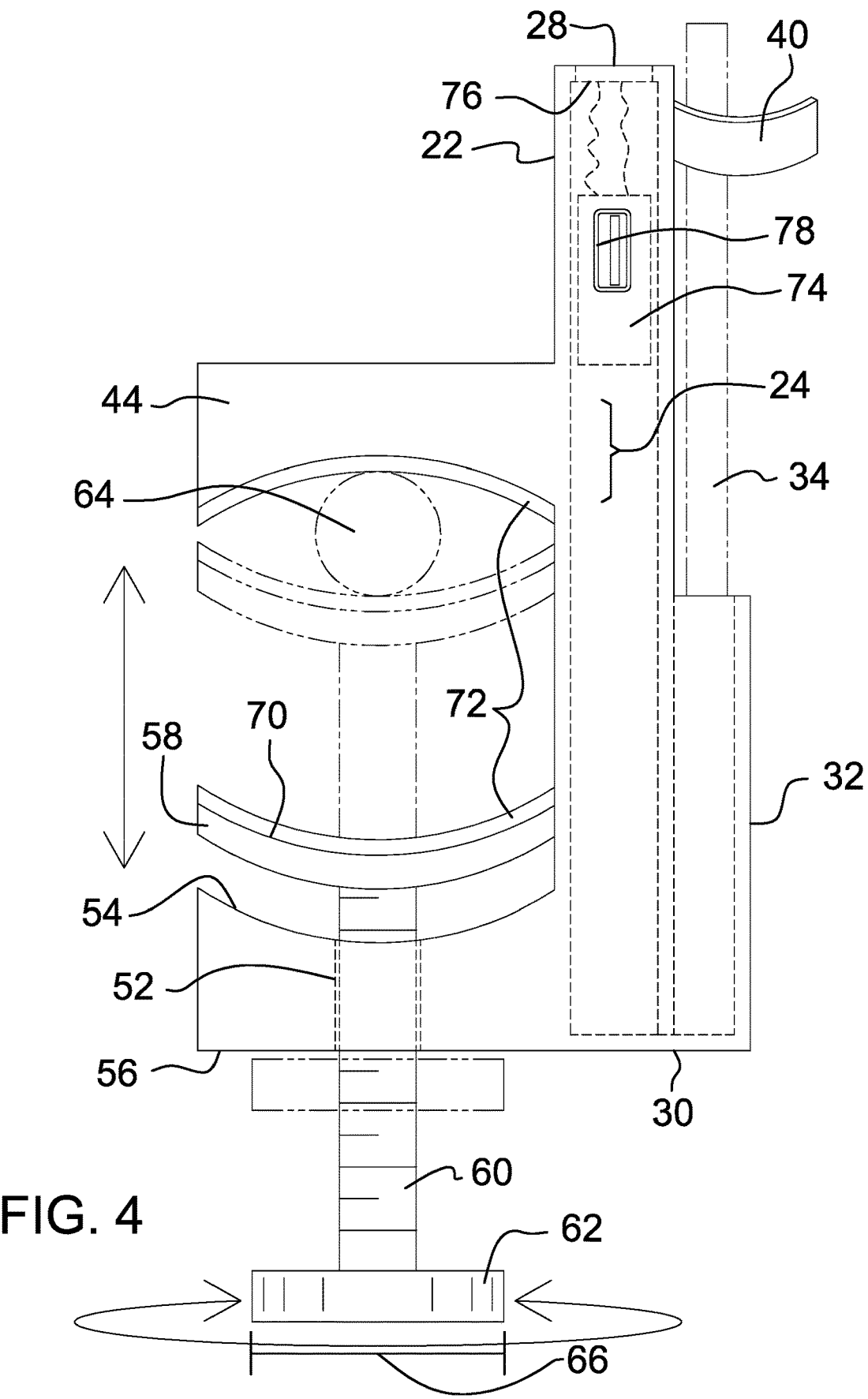
FIG. 4 is a side elevation view of an embodiment of the disclosure.
Figure 5:
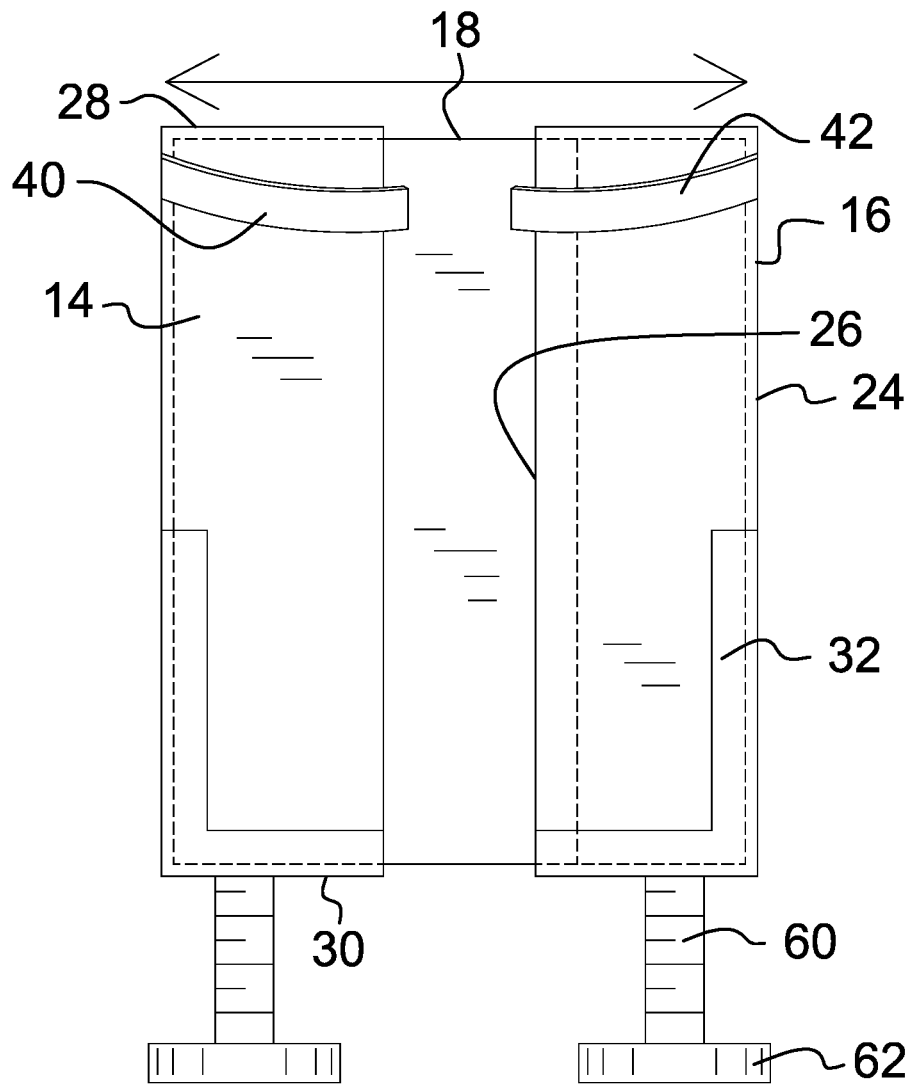
FIG. 5 is a front elevation view of an embodiment of the disclosure.
Figure 6:
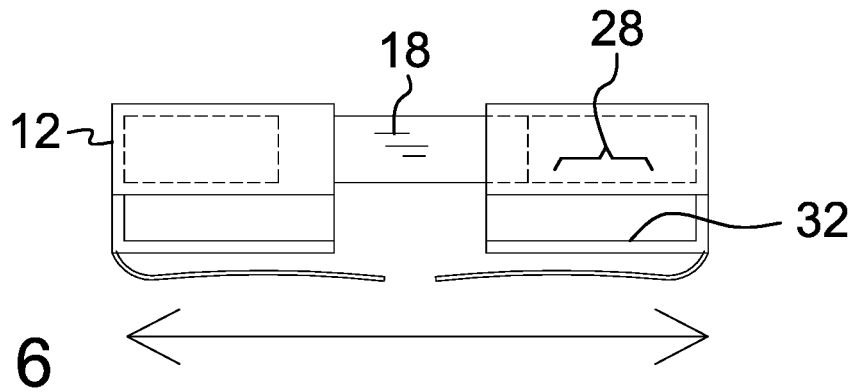
FIG. 6 is a top plan view of an embodiment of the disclosure.

With reference now to the drawings, and in particular to FIGS. 1 through 6 thereof, a new phone holder embodying the principles and concepts of an embodiment of the disclosure and generally designated by the reference numeral 10 will be described.

As best illustrated in FIGS. 1 through 6, the phone caddy stroller clamp apparatus 10 generally comprises a holder body 12 including a left panel 14 and a right panel 16 slidably coupled around a medial portion 18. The left panel 14 and the right panel 16 are each rectangular prismatic and have a panel front side 20, a panel back side 22, a panel outer side 24, an open panel inner side 26, a panel top side 28, and a panel bottom side 30. The open panel inner side 26 slidably receives the medial portion 18 to adjust the width of the holder body 12.

A lip 32 is coupled to the holder body 12. The lip 32 is coupled to the panel front side 20 of each of the left panel 14 and the right panel 16 and is configured to support a personal electronic device 34. The lip 32 may have an L-shaped profile 35 and continuously extends adjacent the entirety of the panel bottom side 30 and a lower portion 36 of the panel outer side 24. The length of the lower portion 36 may be greater than the length of the panel bottom side 30. The L-shaped profile 35 is configured to slidingly receive and secure the personal electronic device 34. A strap 38 may be coupled to the holder body 12 proximal the panel top side 28. The strap 38 comprises a first engagement member 40 coupled to the panel outer side 24 of the left panel 14 and a second engagement member 42 coupled to the panel outer side 24 of the right panel 16. The first engagement member 40 and the second engagement member 42 are selectively engageable and configured to secure the personal electronic device 34. The first 40 and second engagement members 42 may be, but are not limited to, hook-and-loop fasteners, snaps, or other releasable fasteners.

A pair of upper clamp supports 44 is coupled to the holder body 12 and extends from the panel back side 22 of the left panel 14 and the right panel 16. Each upper clamp support 44 has a concave upper bottom face 46 and is otherwise rectangular prismatic. A pair of lower clamps 48 is coupled to the holder body 12. The pair of lower clamps 48 includes a pair of lower clamp supports 50 extending from the panel back side 22 of the left panel 14 and the right panel 16 below the upper clamp supports 44. Each lower clamp support 50 may be a mirror image of the upper clamp support 44. Each lower clamp support 50 has a threaded screw aperture 52 extending from a concave lower top face 54 through a lower bottom face 56. The lower bottom face 56 may be coplanar with the panel bottom side 30. Each lower clamp 48 includes a clamp pad 58, a screw 60 coupled to the clamp pad 58, and a twist knob 62 coupled to each screw 60. The curvature of the clamp pad 58 may conform to the curvature of the lower top face 54 to allow the clamp pad 58 to nest within the lower top face 54 and maximize its range of motion. The screw 60 threadably engages the respective screw aperture 52 to adjust a distance between the clamp pad 58 and the upper bottom face 46 to secure a stroller, a grocery cart, a car seat, or other bar and tube-shaped objects 64. Each twist knob 62 may be disc-shaped and has a diameter 66 substantially conforming to a panel width 68 of each of the left panel 14 and the right panel 16 to improve mechanical advantage and allow the user to sufficiently tighten the lower clamp 48 with only his or her fingers. The upper bottom face 46 and an inner face 70 of the clamp pad may have a rubberized padding 72 to improve grip and prevent damage to the object 64.

A rechargeable battery 74 may be coupled within the holder body 12. A solar panel 76 is coupled to the panel top side 28 of each of the left panel 14 and the right panel 16 and in operational communication with the rechargeable battery 74 to maintain a charge. A device charging port 78 is coupled to the holder body 12 and is in operational communication with the rechargeable battery 74 to charge the personal electronic device 34. The device charging port 78 may be coupled within the panel outer side 24 of the left panel 14 and is a standard charging port such as, but not limited to, USB, micro USB, USB-C, and the like.

In use, the lower clamps 48 are tightened using the twist knobs 62 to engage the object 64 between the clamp pad 58 and the upper bottom face 46. The personal electronic device 34 is then placed within the lip 32 and the left panel 14 and the right panel 16 are squeezed together. The first engagement member 40 and the second engagement member 42 are engaged to tighten the strap 38 across the personal electronic device 34 to ensure it is firmly secured before use by a child.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A phone caddy stroller clamp apparatus comprising:
    a holder body including a left panel and a right panel slidably coupled around a medial portion, the left panel and the right panel each being rectangular prismatic and having a panel front side, a panel back side, a panel outer side, an open panel inner side, a panel top side, and a panel bottom side, the open panel inner side slidably receiving the medial portion;
    a lip coupled to the holder body, the lip being coupled to the panel front side of each of the left panel and the right panel and configured to support a personal electronic device;
    a pair of upper clamp supports coupled to the holder body, the pair of upper clamp supports extending from the panel back side of the left panel and the right panel, each upper clamp support having a concave upper bottom face; and
    a pair of lower clamps coupled to the holder body, the pair of lower clamps including a pair of lower clamp supports extending from the panel back side of the left panel and the right panel below the upper clamp supports, each lower clamp support having a threaded screw aperture extending from a concave lower top face through a lower bottom face, each lower clamp including a clamp pad and a screw coupled to the clamp pad, the screw threadably engaging the respective screw aperture to adjust a distance between the clamp pad and the upper bottom face to secure a stroller, a grocery cart, a car seat, or other bar and tube-shaped objects.

2. The phone caddy stroller clamp apparatus of claim 1 further comprising a strap coupled to the holder body proximal the panel top side, the strap comprising a first engagement member coupled to the panel outer side of the left panel and a second engagement member coupled to the panel outer side of the right panel, the first engagement member and the second engagement member being selectively engageable and configured to secure the personal electronic device.

3. The phone caddy stroller clamp apparatus of claim 1 further comprising the lip having an L-shaped profile and continuously extending adjacent the entirety of the panel bottom side and a lower portion of the panel outer side.

4. The phone caddy stroller clamp apparatus of claim 1 further comprising a rechargeable battery coupled within the holder body; a solar panel coupled to the holder body and in operational communication with the rechargeable battery; and a device charging port coupled to the holder body and in operational communication with the rechargeable battery.

5. The phone caddy stroller clamp apparatus of claim 4 further comprising the solar panel being coupled to the panel top side of each of the left panel and the right panel.

6. The phone caddy stroller clamp apparatus of claim 1 further comprising a twist knob coupled to each screw.

7. The phone caddy stroller clamp apparatus of claim 6 further comprising each twist knob being disc-shaped and having a diameter substantially conforming to a panel width of each of the left panel and the right panel.

8. The phone caddy stroller clamp apparatus of claim 1 further comprising the lower bottom face being coplanar with the panel bottom side.

9. The phone caddy stroller clamp apparatus of claim 1 further comprising the curvature of the clamp pad conforming to the curvature of the lower top face.

10. The phone caddy stroller clamp apparatus of claim 1 further comprising the upper bottom face and an inner face of the clamp pad having rubberized padding.

11. A phone caddy stroller clamp apparatus comprising:
a holder body including a left panel and a right panel slidably coupled around a medial portion, the left panel and the right panel each being rectangular prismatic and having a panel front side, a panel back side, a panel outer side, an open panel inner side, a panel top side, and a panel bottom side, the open panel inner side slidably receiving the medial portion;
a lip coupled to the holder body, the lip being coupled to the panel front side of each of the left panel and the right panel and configured to support a personal electronic device, the lip having an L-shaped profile and continuously extending adjacent the entirety of the panel bottom side and a lower portion of the panel outer side;
a strap coupled to the holder body proximal the panel top side, the strap comprising a first engagement member coupled to the panel outer side of the left panel and a second engagement member coupled to the panel outer side of the right panel, the first engagement member and the second engagement member being selectively engageable and configured to secure the personal electronic device;
a pair of upper clamp supports coupled to the holder body, the pair of upper clamp supports extending from the panel back side of the left panel and the right panel, each upper clamp support having a concave upper bottom face;
a pair of lower clamps coupled to the holder body, the pair of lower clamps including a pair of lower clamp supports extending from the panel back side of the left panel and the right panel below the upper clamp supports, each lower clamp support having a threaded screw aperture extending from a concave lower top face through a lower bottom face, the lower bottom face being coplanar with the panel bottom side, each lower clamp including a clamp pad, a screw coupled to the clamp pad, and a twist knob coupled to each screw, the curvature of the clamp pad conforming to the curvature of the lower top face, the screw threadably engaging the respective screw aperture to adjust a distance between the clamp pad and the upper bottom face to secure a stroller, a grocery cart, a car seat, or other bar and tube-shaped objects, each twist knob being disc-shaped and having a diameter substantially conforming to a panel width of each of the left panel and the right panel, the upper bottom face and an inner face of the clamp pad having rubberized padding;
a rechargeable battery coupled within the holder body;
a solar panel coupled to the holder body, the solar panel being coupled to the panel top side of each of the left panel and the right panel and in operational communication with the rechargeable battery; and
a device charging port coupled to the holder body and in operational communication with the rechargeable battery.

* * * * *